United States Patent [19]

Pipon et al.

[11] Patent Number: 4,882,943

[45] Date of Patent: Nov. 28, 1989

[54] BACKLASH-FREE REDUCING MECHANISM, PARTICULARLY USABLE FOR SETTING VARIOUS PARTS OF A SEAT OF AN AUTOMOBILE VEHICLE

[75] Inventors: Yves Pipon, Saint Georges des Groseillers; Bernard Chales, Aubusson, both of France

[73] Assignee: A&M Cousin, Orne, France

[21] Appl. No.: 278,822

[22] Filed: Dec. 2, 1988

[30] Foreign Application Priority Data

Dec. 3, 1987 [FR] France .................................. 87 16777

[51] Int. Cl.$^4$ ............................................. F16H 55/18
[52] U.S. Cl. ........................................ 74/409; 74/785; 74/801
[58] Field of Search .................. 74/409, 801, 785, 788; 297/366, 367, 368, 355, 330

[56] References Cited

U.S. PATENT DOCUMENTS

| | | | |
|---|---|---|---|
| 3,081,648 | 3/1963 | Duer | 74/801 |
| 3,083,031 | 3/1963 | Elwell | 74/409 X |
| 3,401,979 | 9/1968 | Putsch | 297/366 U X |
| 3,776,067 | 12/1973 | Debruyne et al. | 74/801 |
| 4,759,229 | 7/1988 | Takahashi et al. | 74/409 |

Primary Examiner—Philip C. Kannan
Attorney, Agent, or Firm—Browdy and Neimark

[57] ABSTRACT

The backlash-free reducing mechanism, includes a fixed flange insidely provided with a toothed ring with which meshes a first toothing of a double planet wheel, a mobile flange having an inner toothed ring intended for cooperating with a second toothing of the double planet wheels. The mobile flange is maintained free in rotation in the fixed flange by a circular member. The double planet wheels are maintained in the reducing mechanism by a central planet wheel holding piece having resilient means and are centered on a side of the toothed ring of one of the flanges by a resilient floating idle pinion.

7 Claims, 8 Drawing Sheets

BACKLASH-FREE REDUCING MECHANISM, PARTICULARLY USABLE FOR SETTING VARIOUS PARTS OF A SEAT OF AN AUTOMOBILE VEHICLE

BACKGROUND OF THE INVENTION

The present invention relates to a backlash-free reducing mechanism, particularly usable for setting various parts of a seat of an automobile vehicle.

Most continuous setting mechanisms for automobile vehicle seats use reducing devices with gear trains including generally a single planet wheel. Unfortunately, the disadvantage of this is to create radial forces in the control system, which radial forces are not balanced and are both detrimental to an operation under loads and responsible for the creation of large backlashes.

The mechanism which the invention is directed to is a reducing mechanism including two imbricated gear trains, the inner efforts of which are balanced due to the action of several planet wheels.

Such a type of reducing mechanism is known, but it is the principle which makes it backlash-free which is the subject matter of this invention.

The leading idea of the invention is to resiliently eliminate the undesirable backlashes of the reducing mechanism while preserving realistic manufacturing tolerances.

The basic reducing mechanism includes two flanges, one called the fixed flange and the other called the mobile flange, and which are both provided with an inner toothing defining two rings. These two rings can possibly have a different number of teeth, or the same number of teeth, and inside these two flanges are mounted at least four planet wheels.

Each planet wheel has two toothings having generally a different number of teeth and placed on either side of a cylindrical support element: they are therefore called double planet wheels.

These planet wheels first mesh with the two rings and, also on either side of the cylindrical support elements, with a central pinion. One of these two pinions is intended for being a control member for the receiving mechanism, the other pinion being maintained free in rotation.

Finally, a planet wheel holding piece is intended for receiving the planet wheel cylindrical support elements.

Due to the manufacturing and assembly tolerances, such a reducing mechanism presents of course a beating backlash between the two flanges.

OBJECT AND SUMMARY OF THE INVENTION

An object of the invention is to resiliently eliminate this beating backlash.

The mobile flange being centered in the fixed flange by a pivot connection, the backlash in rotation between these two flanges has therefore to be eliminated.

According to the invention, there is further provided that the toothings of the planet wheels present manufacturing dimensions of which every second one is offset with respect to the nominal dimension so that by tightly pressing the planet wheels against the rings, it is sure that two diametrically opposite planet wheels have one of their toothings applied without any backlash against the fixed flange and that the other two planet wheels have their other toothing applied without any backlash against the mobile flange.

The tight application of the planet wheels inside the rings can be effected either by the planet wheel holding piece having as such, due to its material or to its design, a sufficient resiliency, or by a spring acting on the cylindrical support elements of the planet wheels.

It is therefore understood that (i) one planet wheel is always meshing without any backlash with one ring and with a backlash with the other ring, and that (ii) two diametrically opposite planet wheels are tightly pressed against one flange and the two others against the other flange. This arrangement permits to balance the efforts. There is found that the hereabove principle remains valid with six and even eight planet wheels.

An elimination of the rotation backlash of the mobile flange is effected by eliminating the backlash of the planet wheels according to the three degrees of freedom that a solid has in a plane.

The backlash according to the first degree of freedom (radial backlash) is eliminated by the hereabove described pressing function It is one of the functions of the planet wheel holding piece or the function of the spring.

The backlash according to the second degree of freedom (angular backlash of the position of the planet wheel axes) is eliminated by preventing in a resilient way the planet wheel axis to tip about the meshing point between the planet wheel and the ring with which it cooperates. This function is provided by the planet wheel holding piece which, due to a selection of its material or to its design, has a resiliency allowing it to prevent the backlash of the planet wheels while maintaining a pressure about their cylindrical support elements.

The backlash according to the third degree of freedom (axial backlash) is finally suppressed by eliminating the rotation backlash of tee planet wheels about their own axis due to a resilient idle pinion meshing without any backlash with the planet wheels.

According to the invention, the backlash-free reducing mechanism, particularly usable for setting various parts of a seat of an automobile vehicle, including a fixed flange rigidly connectable to the sitting portion frame of the seat and being insidely provided with a toothed ring with which meshes a first toothing of a double planet wheel having a first and a second toothing, then a mobile flange rigidly connectable to the backing portion frame of the seat and having an inner toothed ring intended for cooperating with a second toothing of the double planet wheels, this mobile flange being maintained free in rotation in the fixed flange by a circular member, and wherein the double planet wheels are maintained by their median cylindrical portion in the reducing mechanism by a central planet wheel holding piece having resilient means intented for tightly pressing at least two planet wheels against the toothing of the fixed flange and at least two planet wheels against that of the mobile flange, and are centered on a side of the toothed ring of one of the flanges by a resilient floating idle pinion intended for connecting without any angular backlash the planet wheels in their rotation about their respective own median cylindrical portions, a pinion driven by a control shaft being additionnally provided for driving the double planet wheels, such a mounting permitting a radial displacement of the double planet wheels by application against the toothed rings of the flanges, while maintaining the median cylindrical portions of the double planet wheels in respective angular positions.

Various other features of the invention will become more apparent from the following detailed description.

BRIEF DESCRIPTION OF THE DRAWINGS

Embodiments of the invention are shown by way of non limiting examples in the accompanying drawings, wherein.

FIG.. 2 is a cross-sectional view taken along line II—II of FIG. 1.

DETAILED DESCRIPTION OF THE PREFERRED EMBODIMENTS

Figure 1:
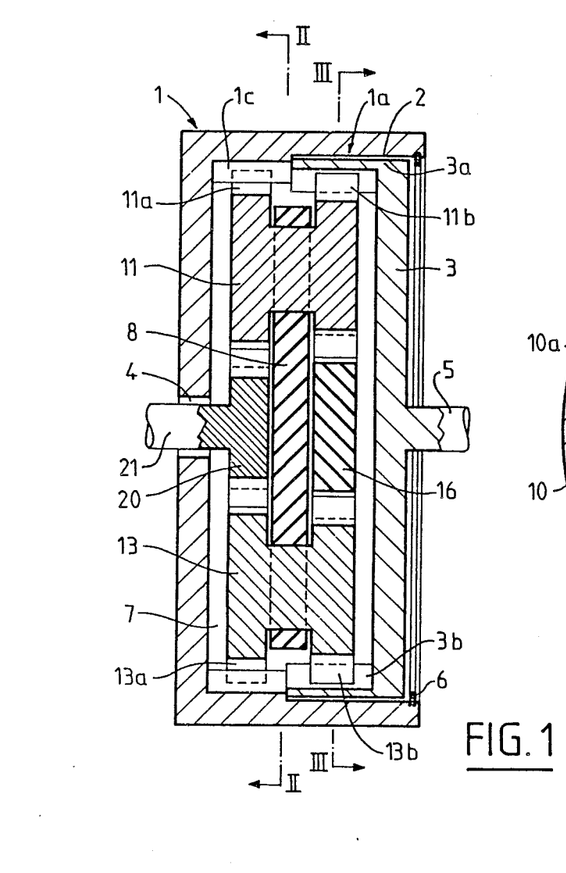
FIG. 1 is a diametrical cross-sectional view of a reducing mechanism with backlash-free gear trains according to the invention.

Referring first to FIG. 1, therein illustrated schematically and as a diametrical cross sectional view is an embodiment of the backlash-free reducing mechanism according to the invention, which includes an outer ring or fixed flange 1 which is connected to the sitting portion frame of a seat when the reducing mechanism is used for the setting of the inclination of the backing portion of this seat.

As shown in FIG. 1, the inner portion 1a of the fixed flange 1 includes outside a recess 2 housing the outer periphery 3a of a receiving ring or mobile flange 3. It should be noted that the fixed flange 1 is formed in its center with a hole 4 the purpose of which will be explained hereafter, while the mobile flange 3 has in its center a shaft 5.

Figure 2:
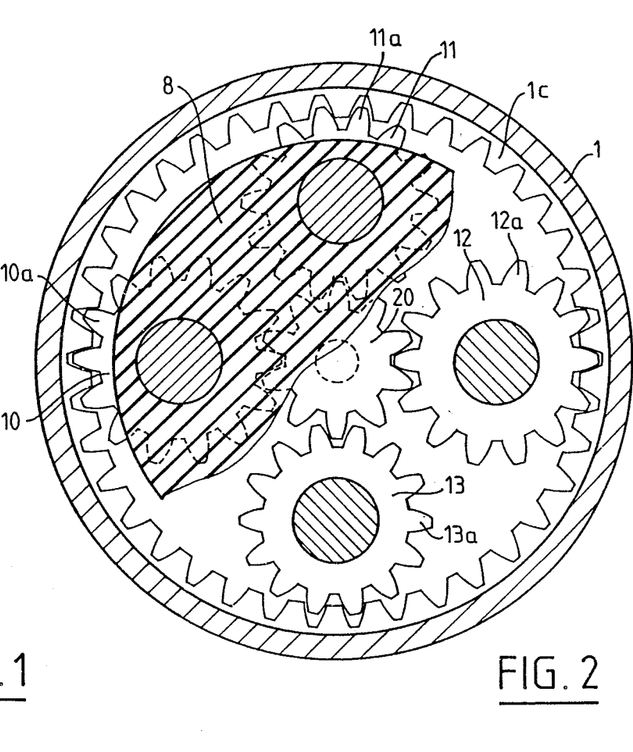
Figure 3:
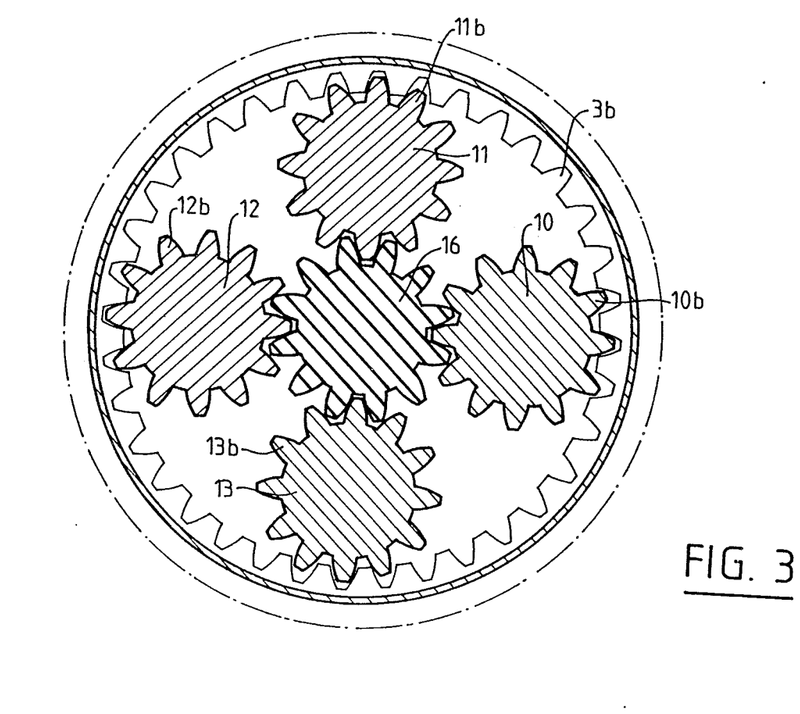
FIG. 3 is a cross-sectional view taken along line III—III of FIG. 1.

As can be seen in FIG. 3, the mobile flange 3 defines inside a toothed ring 3b, and the same applies to the inner periphery 1c of the fixed flange 1, as shown in FIG. 2.

The mobile flange 3 is maintained inside the fixed flange 1 by a circlip 6 (see FIG. 1), but in some cases the embodiment can be different as will be described with reference to FIG. 4.

Likewise, it is possible in some instances to interpose between the fixed flange 1 and the mobile flange 3 one or several ball bearings, or a needle bearing, so as to limit the friction between the two flanges.

The inner cavity 7 defined by the two flanges 1, 2 placed inside one another contains in its center a central planet wheel holding piece 8 which, in the present embodiment, is made of a material having a certain resiliency so as to correctly maintain in their respective positions four double planet wheels 10, 11, 12, 13 each having on either side of a cylindrical portion, on the one hand, a toothing 10a, 11a, 12a, 13a and, on the other hand, a toothing 10b, 11b, 12b, 13b.

According to a feature of the invention, the manufacturing dimensions of the toothings of the planet wheels 10, 11, 12, 13 are such that every second one is offset with respect to the nominal dimension, and the toothings 10a, 11a, 12a, 13a mesh with the toothing of the toothed ring 1c of the fixed flange 1 while the toothings 10b, 11b, 12b, 13b mesh with the toothing of the toothed ring 3b of the mobile flange 3.

Moreover and as it can be seen in FIG. 3, an idle floating pinion 16 meshes with the toothings 10b, 11b, 12b, 13b. The idle pinion 16 is made of a material having a certain resiliency coeffficient and meshes without any backlash with the four planet wheels 10, 11, 12, 13, thereby suppressing the backlash in rotation of the planet wheels about their own axis.

As particularly shown in FIG. 2, the toothings 10a, 11a, 12a and 13a of the corresponding double planet wheels 10, 11, 12 and 13 mesh with a control pinion 20 mounted at the end of a shaft 21 intended for connecting the reducing mechanism either with a manual control member or with a motorized control member. The shaft 21 extends through the hole 4 of the fixed flange 1.

As can be seen from the preceding description, and due to the manufacturing dimensions of the toothings of the planet wheels, the mounting is made in such manner that the planet wheel holding piece 8 systematically presses tightly two diametrically opposite planet wheels against one toothed ring and the two others against the other toothed ring.

There is thereby obtained, on the one hand, due to the fact that the central planet wheel holding piece 8 is made of a plastics material, a good meshing of the toothings of the planet wheels 10, 11, 12, 13 in the toothed rings 1b and 3b of the fixed and mobile flanges 1 and 3, and, on the other hand, a holding of these planet wheels 10, 11, 12, 13 so as to eliminate the tipping phenomenon of each planet wheel about its meshing point with the toothed ring in consideration.

The elimination of the rotation backlash of the planet wheels 10, 11, 12, 13 about their own axis carried by the central planet wheel holding piece 8, is obtained due to the presence of the idle pinion 16 having certain resilient properties and meshing without any backlash with the toothings 10b, 11b, 12b and 13b.

Figure 4:
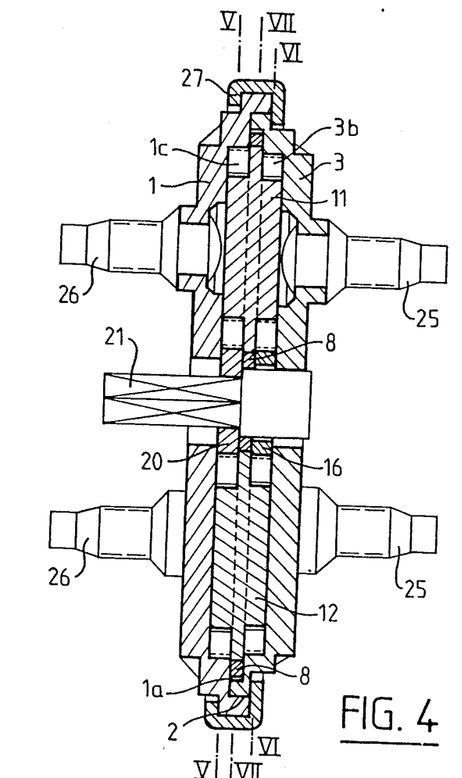
FIG. 4 is a transverse cross-sectional view of a particular embodiment of the reducing mechanism of the invention.

FIG. 4 is a transverse cross sectional view of an embodiment of the reducing mechanism according to the invention. As shown, a channel is provided in the center of the planet wheel holding piece 8 for passage of the driving shaft 21 of FIG. 1. On the other hand, in the preferred application of the reducing mechanism to the setting of the various parts of a seat of automobile vehicles, studs 25 are connected to the backing portion frame, and studs 26 to the sitting portion frame of the seat. Likewise, instead of the circlip 6 of FIG. 1, there is provided in FIG. 4 a circular ring 27 maintaining the flanges 1 and 3 one on each other and permitting a rotation of the flange 3 with respect to the flange 1.

Figure 5:
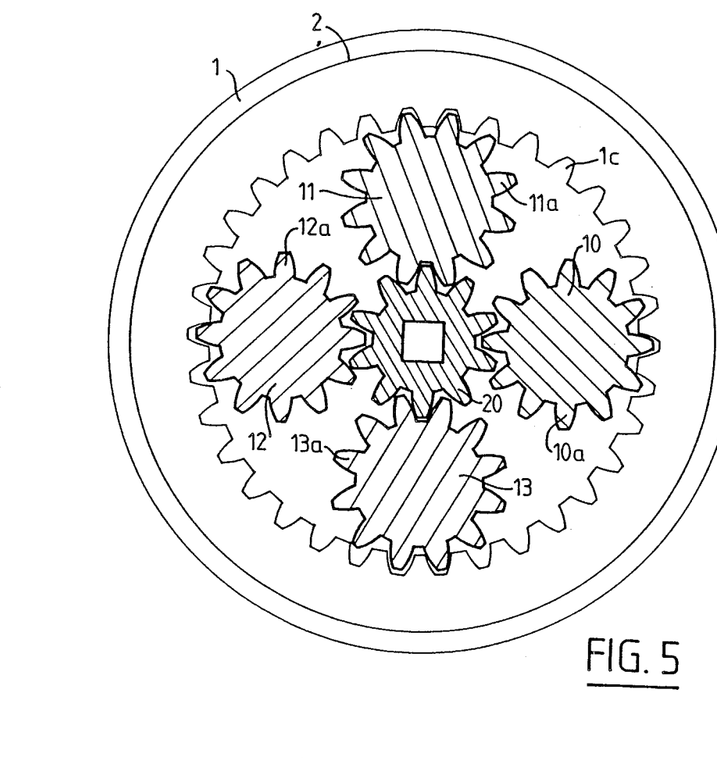
FIG. 5 is a cross-sectional view taken along line V—V of FIG. 4.

In FIG. 5 which is a cross sectional view taken along line V—V of FIG. 4, there is shown an arrangement the planet wheels 10, 11, 12, 13 and of the control pinion 20 in the fixed flange 1. As shown, the toothings 11a, 13a of the planet wheels 11, 13 mesh without any backlash with the toothed ring 1c of the fixed flange 1, and there exists a certain backlash between the toothings 10a, 12a of the planet wheels 10, 12 and the ring 1c.

Figure 6:
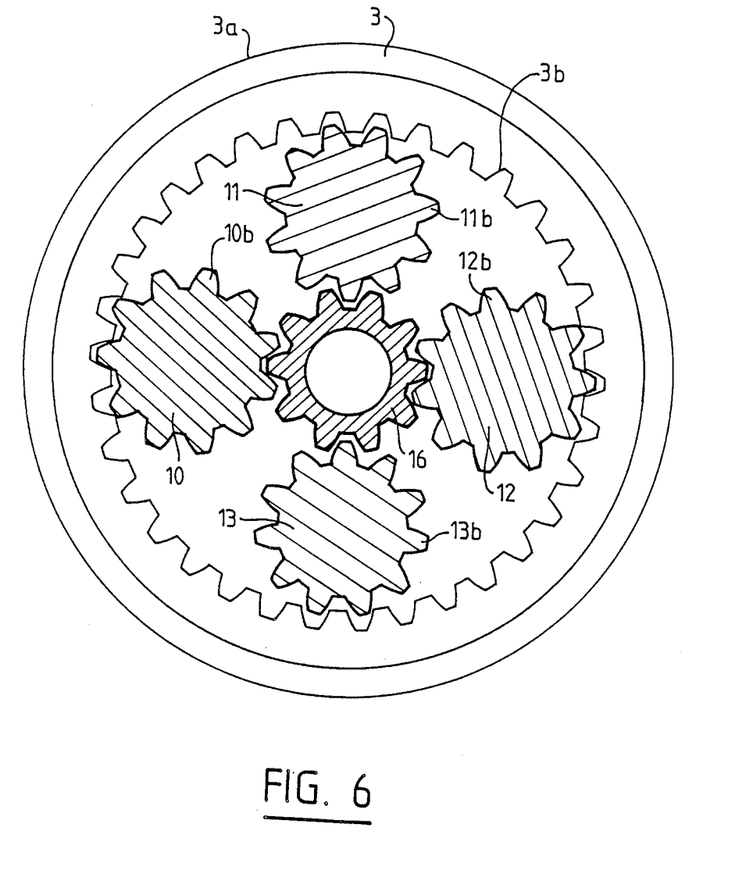
FIG. 6 is a cross-sectional view taken along line VI—VI of FIG. 4.

In FIG. 6 which is a cross sectional view taken along line VI—VI of FIG. 4, there is shown an arrangement of the planet wheels 10, 11, 12, 13 and of the resilient idle pinion 16 in the mobile flange 3. As shown the toothings 10b, 12b of the planet wheels 10, 12 mesh without any backlash with the toothed ring 3b of the mobile flange 3, and there exists a certain backlash between the toothings 11b, 13b of the planet wheels 11, 13 and the ring 3b. On the other hand, the resilient idle pinion 16 meshes without any backlash with the toothings 10b, 11b, 12b and 13b, thereby eliminating the rotation backlash of the planet wheels about their own axis.

Figure 7:
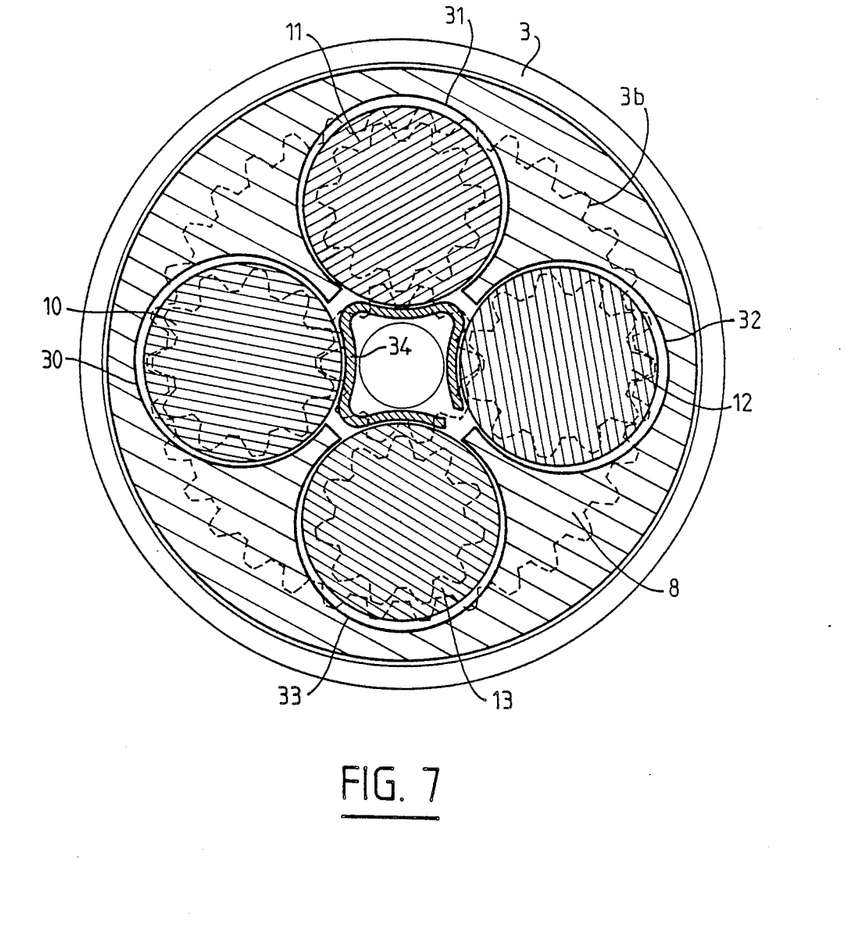
FIGS. 7 and 7a are cross sectional views taken along line VII—VII of FIG. 4 of two alternative embodiments.

FIG. 7 is a cross sectional view of the mechanism of FIG. 4 taken along line VII—VII and shows the reducing mechanism incorporating a first embodiment according to the invention of the central planet wheel holding piece 8.

In FIG. 7, the central planet wheel holding piece 8 is formed with four cells 30, 31, 32, 33 intended for receiving the cylindrical support elements of the planet wheels 10, 11, 12, 13 and a central recess enabling to position a spring 34. The spring 34 bears on the cylindrical support elements of the planet wheels so as tightly press the planet wheels against the rings, as previously described. It should be noted that the central planet wheel holding piece 8 has a sufficient resiliency for maintaining a pressure on the cylindrical support elements of the planet wheels so as to prevent their axes from tipping. This central piece is guided by its outer periphery in the mobile flange 3 and maintained in translation between the two flanges 3 and 1.

Figures 8, 9:
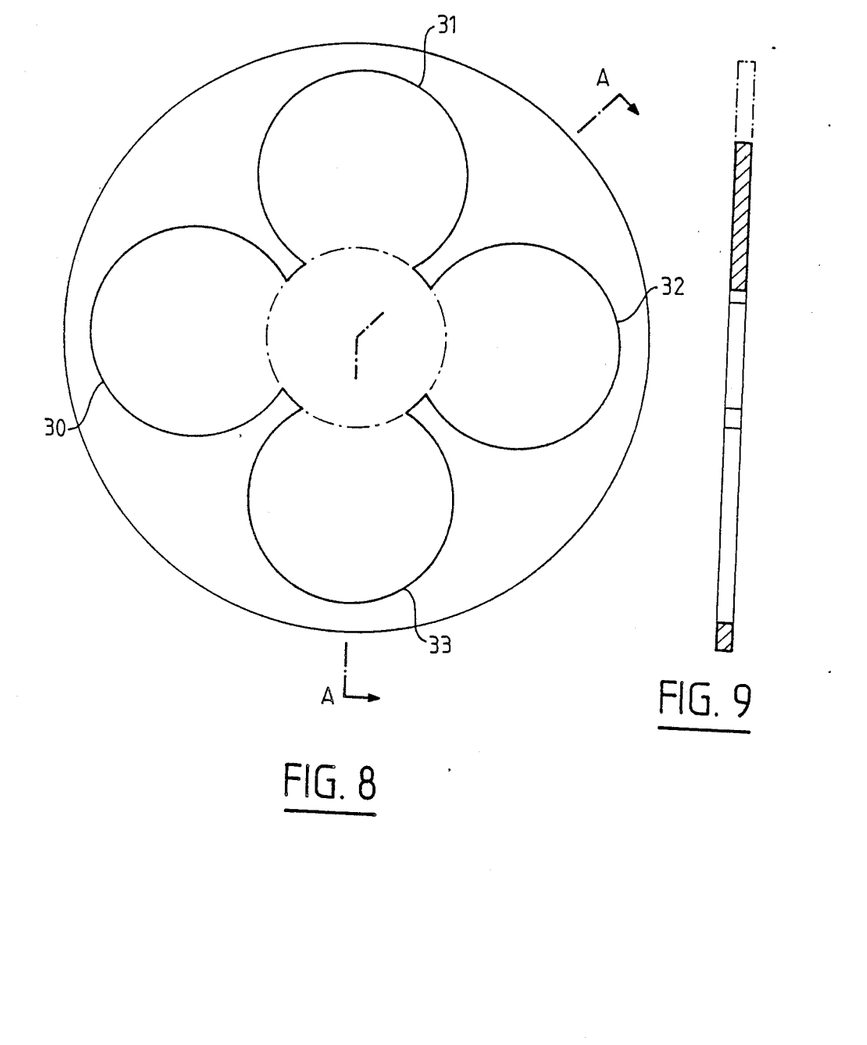
FIGS. 8 and 9 are two illustrations of a first embodiment of the central planet wheel holding piece of the invention, respectively, in a plan view and in a cross sectional view taken along line A—A of the plan view.

In FIGS. 8 and 9 showing the central planet wheel holding piece 8 of FIG. 7, the cells 30, 31, 32, 33 which are intended for receiving the cylindrical support elements of the planet wheels 10, 11, 12, 13 have an oblong shape so as to permit a radial displacement toward the rings of the planet wheels while maintaining the axes of these planet wheels in their respective angular positions. The cells 30, 31, 32, 33 have the shape of a four-leafed clover at the center of the central planet wheel holding piece 8.

Figure 7A:
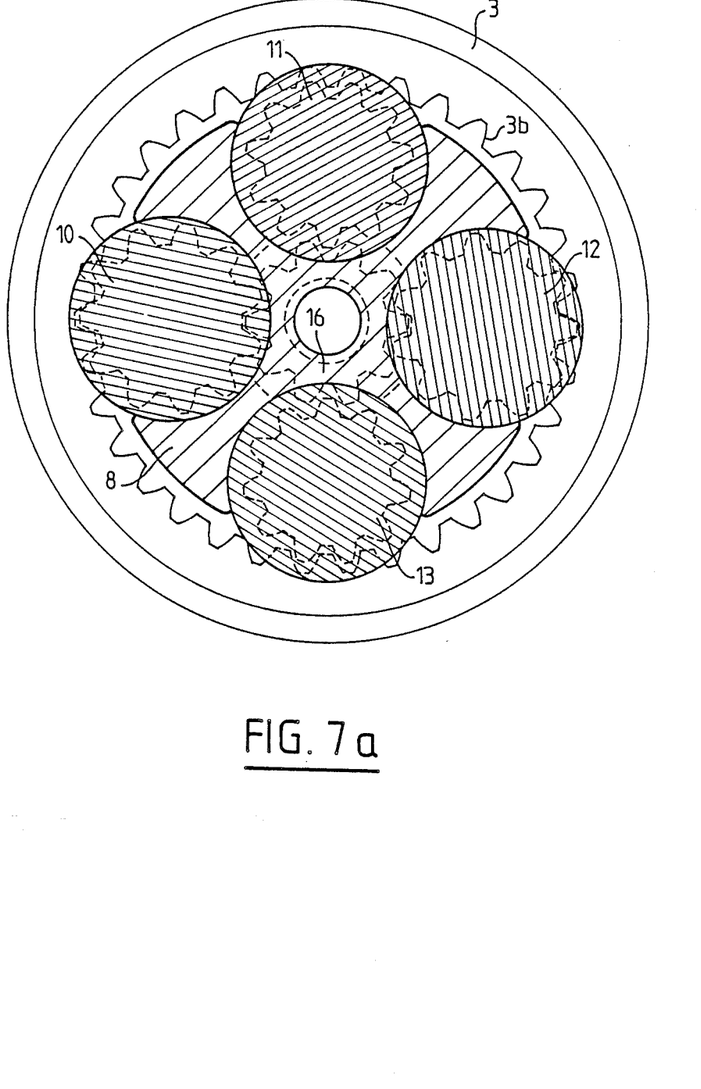

FIG. 7a is, samely as FIG. 7, a cross sectional view of the mechanism of FIG. 4 taken along line VII—VII, and shows the reducing mechanism including alternative embodiments of the central planet wheel holding piece 8.

In FIG. 7a, the pressing function of the planet wheels against the rings and the resilient maintenance of the axes of these planet wheels are provided only by the central planet wheel holding piece.

Figure 10:
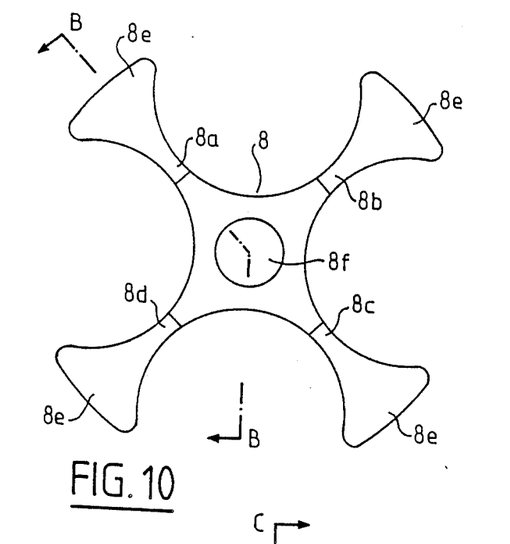
FIGS. 10 and 11 two illustrations of a second embodiment of the central planet wheel holding piece of the invention, respectively in a plan view and in a cross sectional view taken along line B—B of the plan view.
Figure 11:
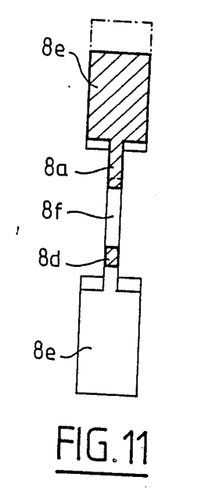

Two embodiments of the central planet wheel holding piece 8 of FIG. 7a are shown in FIGS. 10, 11 and respectively 12, 13 in which the central planet wheel holding piece 8 is designed in a material having a certain resiliency enabling it to tightly apply the planet wheels according to the invention and to maintain the respective positions of the axes of these planet wheels by applying a pressure on the cylindrical support elements of the planet wheels.

In FIGS. 10, 11, the central planet wheel holding piece 8 has the shape of a St Andrew's cross, the branches of which 8a, 8b, 8c, 8d each terminate by a pad 8e normally bearing against the inner walls of the flanges 1 and 3. A central opening 8f enables passage of the driving shaft 21 of FIG. 4.

Figures 12, 13:
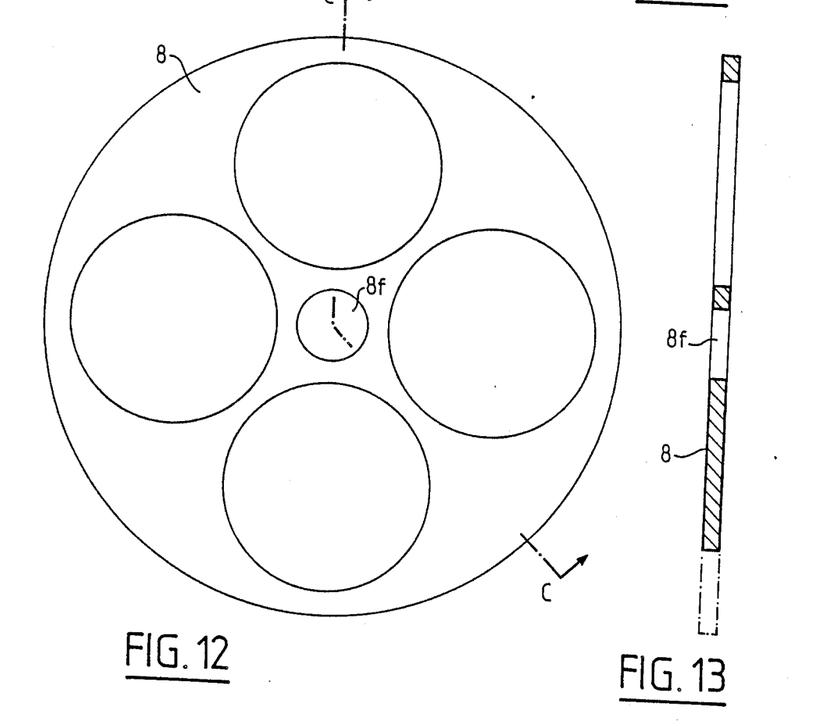
FIGS. 12 and 13 are two illustrations of a third embodiment of the central planet wheel holding piece of the invention, respectively in a plan view and in a cross sectional view taken along line C—C of the plan view.

FIGS. 12 and 13 show another embodiment of the central planet wheel holding piece 8, which can replace the St Andrew's cross of FIGS. 10 and 11.

On the other hand, it should be noted that the reducing mechanism of the preceding figures can be made irreversible according to the same principles as those of a wheel and screw type system, and therefore does not generally necessitate a complementary locking when used in connection with a vehicle seat.

What is claimed is:

1. A backlash-free reducing mechanism, particularly usable for setting various parts of a seat of an automobile vehicle, including a fixed flange (1) rigidly connectable to a sitting portion frame of the seat and being insidely provided with a toothed ring (1c) with which meshes a first toothing of a double planet wheel (10, 11, 12, 13) having a first and a second toothing, then a mobile flange (3) rigidly connectable with a backing portion frame of the seat and having an inner toothed ring (3b) intended for cooperating with a second toothing of the double planet wheels (10, 11, 12, 13), this mobile flange (3) being maintained free in rotation in the fixed flange (1) by a circular member (6, 27), and wherein the double planet wheels (10, 11, 12, 13) are maintained by a median cylindrical portion thereof in the reducing mechanism by a central planet wheel holding piece (8) having resilient means and are centered on a side of the toothed ring of one of the flanges (1, 3) by a resilient floating idle pinion (16), a pinion (20) driven by a control shaft (21) being additionally provided for driving the double planet wheels (10, 11, 12, 13), such a mounting permitting a radial displacement of the double planet wheels by application against the toothed rings of the flanges (1, 3), while maintaining the median cylindrical portions of the double planet wheel (10, 11, 12, 13) in respective angular positions.

2. A reducing mechanism as set forth in claim 1, wherein every second dimension of the toothings of the planet wheels is offset with respect to the nominal dimension, so that by tightly pressing the planet wheels against the toothed rings of the flanges (1, 3), two of the diametrically opposite planet wheels have one of their toothings applied without any backlash against the fixed flange (1) and two other diametrically opposite planet wheels have their other toothing applied without any backlash against the mobile flange (3).

3. A reducing mechanism as set forth in claim 1, wherein the central planet wheel holding piece (8) is formed with a central recess and with cells intended for receiving central support elements of the planet wheels (10, 11, 12, 13).

4. A reducing mechanism as set forth in claim 3, wherein a spring (34) is provided in the central recess in order to apply a force against the planet wheels.

5. A reducing mechanism as set forth in claim 1, wherein the central planet wheel holding piece (8) is provided with cells having an oblong shape forming a kind of four-leafed clover in a center of the central planet wheel holding piece.

6. A reducing mechanism as set forth in claim 1, wherein the central planet wheel holding piece (8) is made of a material having resilient properties.

7. A reducing mechanism as set forth in claim 1, wherein the central planet wheel holding piece (8) has, in plane, a shape of a St Andrew's cross, having openings which are intended for receiving cylindrical support elements of the double planet wheels (10, 11, 12, 13) and ends of branches (8a, 8b, 8c, 8d) which each carry a curved pad (8e).

* * * * *